Sept. 20, 1932.   H. C. GANTER   1,878,485

GLASS MAKING MACHINE

Original Filed March 9, 1925   2 Sheets-Sheet 1

WITNESSES:

INVENTOR
Henry C. Ganter
BY
ATTORNEY

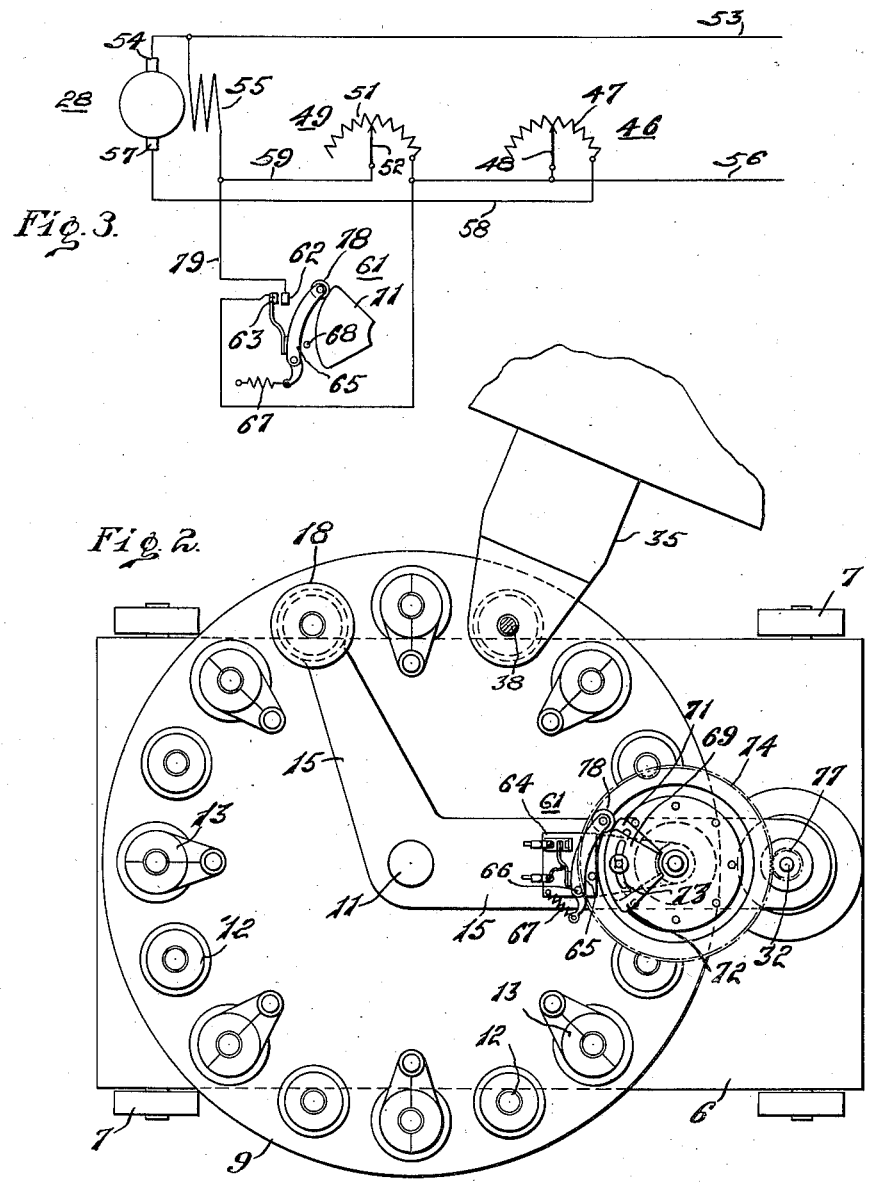

Patented Sept. 20, 1932

1,878,485

UNITED STATES PATENT OFFICE

HENRY C. GANTER, OF NATRONA, PENNSYLVANIA, ASSIGNOR TO ATLANTIC BOTTLE COMPANY, A CORPORATION OF NEW YORK

GLASS MAKING MACHINE

Application filed March 9, 1925, Serial No. 14,098. Renewed February 3, 1932.

My invention relates to machinery for making glass ware and particularly to machines for making hollow ware such as bottles and jars and various forms of pressed or molded ware.

An object of my invention is to provide a bottle making machine having a plurality of blank and bottle molds wherein the quantity of glass used in the making of the bottle may be selectively varied as desired.

Another object of my invention is to provide a glass ware machine having the above noted characteristics wherein the apparatus for controlling the quantity of glass supplied to the molds may be readily applied to standard glass ware machines now in use.

Another object of my invention is to provide a glass ware machine with simple and inexpensive apparatus for regulating the quantity of glass supplied to different molds that may be actuated by elements already in standard present types of glass making machines.

These and other objects that will be made apparent throughout the further description of my invention are attained by means of the glass ware machine hereinafter described and illustrated in the accompanying drawings wherein:

Fig. 2 is a plan view of the bottle making machine shown in Fig. 1, and

Fig. 3 is a diagram of the electrical connections employed in the control apparatus.

Figure 1:
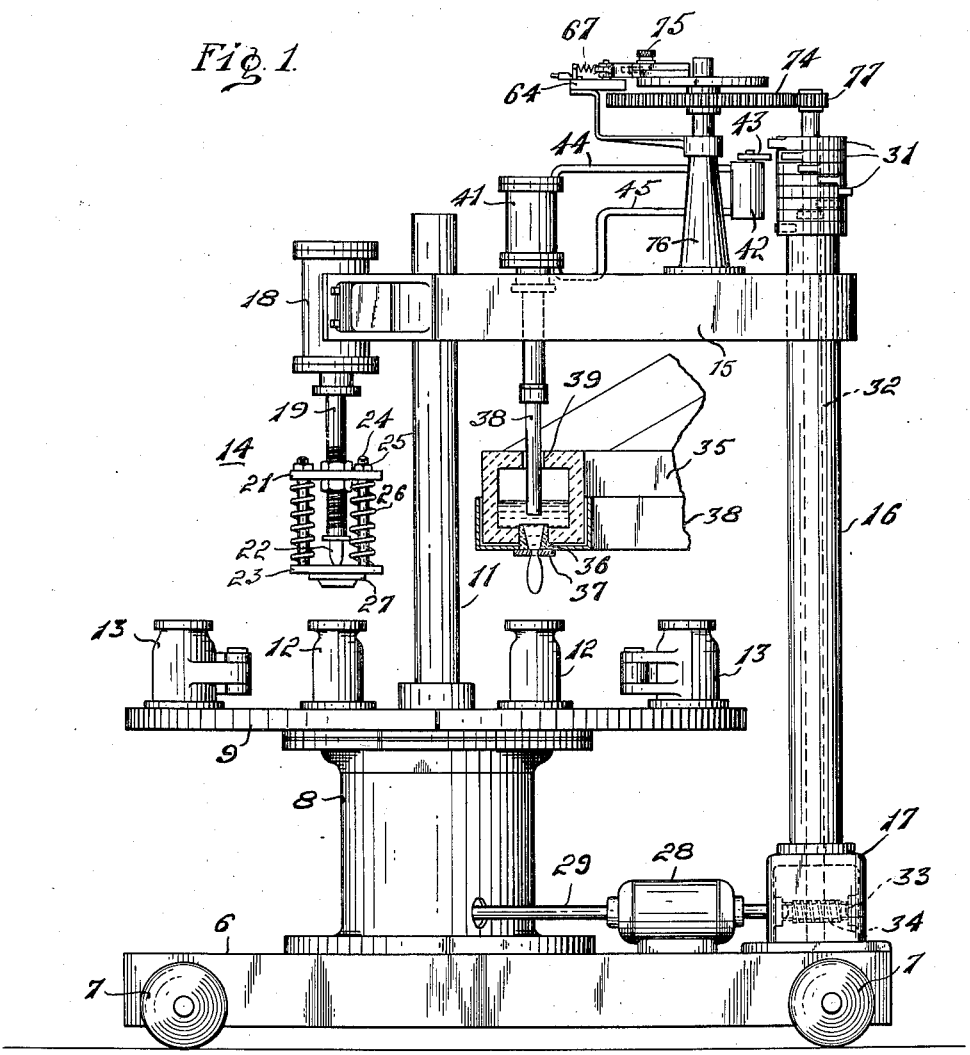
Figure 1 is a side elevational view of a bottle making machine embodying features of my invention, certain of the molds being removed for clearness of illustration and a portion of the glass feeding mechanism being shown in vertical section.

In my copending application Serial No. 14,097 filed March 9, 1925, I have shown a standard type of bottle making machine equipped with apparatus for varying the shape of the neck of the blank and bottle. As previously stated it is an object of my invention illustrated in the accompanying drawings to selectively vary the quantity of glass supplied to the various molds that are mounted on a rotatable table. Means are provided for making a certain proportion of the bottles produced in one revolution of the mold table, lighter or heavier than the remaining bottles.

Referring to the drawings, the bottle making machine comprises a base 6 that is rendered portable by means of wheels 7. Upon the base 6, a supporting casing 8 is mounted and it serves to rotatably support a mold table 9 which rotates about a center shaft 11 which extends through the casing 8 and is secured to the base 6.

A plurality of blank molds 12 and bottle molds 13 are mounted upon the table in spaced relation to one another, the blank and bottle molds being alternately disposed equidistant from one another and from the center shaft 11.

The blank molds 12 are adapted to be successively brought into registry with a pressure head 14 which is supported upon a bracket 15 that is in turn supported upon the center shaft 11 and a standard 16, the latter terminating in a gear casing 17, which is secured to the base 6. The pressure head is of standard construction, well known to those skilled in the art and comprises an operating cylinder 18 that is mounted on the bracket 15 and which is provided with a reciprocating piston rod 19 upon which a supporting plate 21 is adjustably mounted. A blank forming plunger 22 is detachably secured to the piston rod 19 and is adapted to be moved downwardly by the piston rod into the blank mold 12 when the latter is moved into registry therewith. A floating plate 23 is yieldingly atached to the supporting plate 21 by means of bolts 24 and the position of the floating plate with respect to the supporting plate 21 is regulated by means of nuts 25. Springs 26 are disposed on the bolts 24 between the supporting plate and the floating plate for tensioning a bead forming plate 27 that is secured to the floating plate 23 in engagement with the top of the blank mold 12. The bead forming plate serves to form a bead on the neck of the bottle and a recess for receiving a cardboard closure or cap.

The mold table 9 is intermittently moved through 45° in order to successively bring the blank molds, eight in number, into registry with the pressure head 14. The table in this instance is driven by means of a direct current electric motor 28 having a worm shaft 29 which meshes with star wheel mechanism, not shown, and which is of well known construction. The star wheel is connected to the table 9 and intermittently turns the table to bring the blank molds successively into registry with the pressure head.

The pressure head 14 is controlled by means of one of a group of cams 31 that are adjustably mounted upon a cam shaft 32 that is mounted within the standard 16 and which is provided at its lower end with a worm wheel 33 which meshes with a worm 34 on the worm shaft 29. One of the cams 31 actuates an air pressure controlling valve, not shown, that is connected to the cylinder 18 in such manner that it causes the plunger 22 to be raised and lowered at proper intervals.

After a blank has been formed, it is automatically transferred to a blow mold 13 wherein it is blown by a blowhead, not shown, into the form of a bottle. The previously described apparatus is typical of bottle making machines in common use and therefore details of the machine which do not concern my invention are not described in detail as such apparatus is well known in the art.

Another feature of the present types of bottle making machines is the glass feeding mechanism which comprises a spout 35 that extends from a tank containing molten glass, not shown, and which is made of refractory material such as fire clay. The bottom of the spout is provided with a circular opening in which a fire clay sleeve 36 is inserted having a frusto-conical orifice extending therethrough, through which the molten glass may flow when permitted. The sleeve 36 is supported by a perforated metal plate 37 that is attached to the metal reenforcing shell 38 of the spout 35.

A hollow fire clay plunger 38 extends through an opening 39 in the upper side of the spout 35 and is so aligned with the sleeve 36 that it serves to shut off the flow of glass through the orifice when the plunger is moved downwardly into engagement with the walls of the orifice. The plunger is actuated intermittently by means of a compressed fluid motor or cylinder 41 that may be supported either on the frame of the bottle making machine or upon supports independent thereof, preferably the latter. The operation of the plunger 38 is controlled by means of a valve 42 having a lever 43 actuated by one of the cams 31. The valve is connected to the ends of the cylinder 41 by means of conduits 44 and 45. When the lever 43 is in one position, compressed fluid is admitted to the upper end of the cylinder and forces the plunger 38 into engagement with the sleeve 36, thereby stopping the flow of glass from the orifice. When the lever is in another position fluid pressure is applied to the lower end of the cylinder 41 causing the plunger 38 to be raised for a predetermined time, depending upon the position of the controlling cam 31 and its shape.

The glass feeding apparatus just described is of well known standard construction and consequently is not described in minute detail.

It is an object of my invention to regulate the amount of glass that is supplied to the blank molds in order to vary the quantity to be delivered to certain selected molds for the purposes of making bottles having different quantities of glass therein.

Under normal operating conditions the plunger controlling cam 31 is adjusted so that during the time that the mold table is at rest, a predetermined quantity of glass will be permitted to flow from the orifice in the spout 35 into a blank mold registered with the orifice. The cam 31 is so geared to the motor and to the rotary mold table that it makes one complete revolution each time the mold table is turned through 45° or in other words, it makes eight revolutions while the mold table is making one revolution.

In order to vary the quantity of glass delivered to the blank mold in the manner described, without changing the adjustment of the controlling cam 31, I control the electric current being supplied to the direct current motor 28. In the event that the glass feeding apparatus is so adjusted that it delivers sixteen ounces of glass to the blank molds and it is desired to permit but fourteen ounces of glass to the blank molds to form a lighter weight bottle, I so control the current supplied to the field winding of the motor that the motor is caused to increase its speed and thereby increase the speed of rotation of the controlling cam 31. As the glass flows from the orifice in the spout 35 at a uniform rate, less glass will flow into the blank mold within a reduced period of time. Consequently the amount of glass delivered to the blank mold is reduced without necessitating any adjustment of the controlling cam 31.

The apparatus for effecting the change of quantity of glass to be delivered to the blank molds is of such nature that any desired number of molds may be supplied with a predetermined quantity of glass. If it is desired to make four bottles of light weight and four of heavy weight, means are provided for accomplishing this result.

Referring to Fig. 3, wherein the diagram of the electrical connections to the motor is illustrated, it will be seen that I provide a starting rheostat 46 having a resistance element 47 and an adjustable contact member 48 and a secondary rheostat 49 having a resistance element 51 and a movable contact 52. Current is supplied to the motor through a conductor 53 that is connected to an armature brush 54 and to one end of the field coil 55 of the motor. The feed conductor 56 of opposite polarity to that of conductor 53 is connected to the movable contact 48 and current flows to the brush 57 of the motor through the resistance element 47 of the rheostat 46 and a conductor 58. The secondary rheostat is connected in series with the field winding 55, the movable contact 52 being connected to the field winding by the conductor 59 and the resistance element 51 being connected to the movable contact 48 of the rheostat 46. A switch 61 having a stationary contact 62 and a movable contact 63 is so connected in the circuit that it shunts the secondary resistance 52 when closed. The switch 61 is mounted upon an insulating panel 64 that is supported on the frame 15, the movable contact 63 being mounted upon a pivoted actuating arm 65 that is secured to the base 64 by a pin 66. The switch is normally yieldingly retained in closed position by means of a spring 67, the closed position of the arm 65 being limited by means of a stop member 68.

The switch contact 63 is adapted to be moved to open position at predetermined intervals by means of a cam 69 comprising two segmental plates 71 and 72 that are provided with arcuate slots 73 and adjustably secured to a gear wheel 74 by means of a bolt 75. The gear wheel 74 is rotatably mounted upon a standard 76 mounted upon the frame 15 and meshes with a pinion 77 secured to the upper end of the cam shaft 32, the ratio between the pinion and gear wheel being 1 to 8, thus causing the gear wheel 74 to turn one-eighth of a revolution while the cam shaft 31 makes one complete revolution. From the foregoing it will be seen that the gear wheel 74 is turned one-eighth of a revolution to every one-eighth revolution of the mold table.

A roller 78 rotatably mounted on the free end of the switch operating lever 65 engages the peripheral edge of the adjustable cam 69, the cam holding the switch contact 63 out of engagement with the contact 62 during the time the roller 78 is in engagement with the cam 69.

Assuming, for the purpose of illustration, that the machine has been set up for making bottles in each mold, weighing sixteen ounces, and it is desired to make one bottle weighing fourteen ounces, out of every eight bottles made during a complete revolution of the mold table. The cam 69 is so adjusted with respect to the cam 31 controlling the plunger 38 of the glass feeding apparatus that it causes the switch 61 to be opened just prior to the raising of the glass feeding plunger 38.

It is well known that if the current through the field winding of a direct current motor is reduced, that the motor is caused to increase in speed. If it is desired to produce a bottle weighing less than those being made while no resistance is inserted in the field winding, the movable contact 52 of the secondary rheostat 49 is so adjusted that the speed of the motor is increased to the point where but fourteen ounces of glass can be delivered before the feeding plunger 38 shuts off the flow. Any desired quantity of glass may be delivered to the blank molds during each operation of the plunger by changing the resistance in the field winding of the motor through the medium of the secondary rheostat 49. When the cam 69 causes the shunt circuit 79 to be opened, the speed of the motor will be increased thereby reducing the quantity of glass delivered to the blank mold then beneath the discharge orifice. The time at which the switch 61 is opened and closed may be adjusted to suit requirements by adjusting the cam plates 71 and 72 relative to one another.

If it is desired that more than one bottle be made having a reduced quantity of glass therein, the length of the cam 69 may be increased to increase the time in which the switch 61 is held in closed position. Additional cams may be mounted upon the gear wheel 74 if it is desired to have a majority of the bottles made with a reduced quantity of glass. Where a substantially equal number of bottles of different weight are to be made during a revolution of the mold table it has been found desirable to so adjust the timing cams 71 and 72 that each alternate mold is supplied with a different quantity of glass. Proper working temperatures of the molds are thus maintained.

From the foregoing it will be seen that the weight of the glass delivered to the blank molds may be varied at will without disturbing the adjustments of the controlling cams 31. By reason of this apparatus, a predetermined number of bottles of different weights may be made during each complete revolution of the mold table.

While I have shown but one embodiment of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. The combination with a glass forming machine having a plurality of movable molds and a glass feeding device for depositing quantities of glass in each mold when moved into registry with the feeding device, the quantity being proportional to the time between successive movements of the molds, of means for automatically and at predetermined intervals altering the time of movement of the molds for varying the quantity of glass delivered thereto.

2. The combination with a glass forming machine having a plurality of movable molds and a glass feeding device for delivering a quantity of glass to the mold proportional to the speed of operation of the machine, of means for automatically varying the speed of the machine at predetermined intervals to cause different quantities of glass to be deposited in the molds.

3. The combination with a glass forming machine having a plurality of movable molds, a glass feeding device for delivering a quantity of glass to the molds proportional to the speed of operation of the machine, and a motor for driving the machine, of means for automatically varying the speed of the motor when selected molds are brought into operative relation to the feeding means whereby the quantity of glass delivered to the selected mold is varied.

4. The combination with a glass forming machine having a plurality of movable molds, a glass feeding device for delivering a quantity of glass to the mold proportional to the speed of operation of the machine, and an electric motor for driving the machine, of means for automatically varying the current condition in the motor at selected intervals for effecting a change in speed of the motor and machine, to thereby effect variation of the quantity of glass delivered to selected molds.

5. The combination with a glass forming machine having a plurality of movable molds, a glass feeding device for delivering a quantity of glass to the molds proportional to the speed of operation of the machine, and an electric motor for driving the machine, of means for automatically altering the resistance in the field winding of the motor at selected intervals for varying the speed of the machine and effecting variations in the quantity of glass delivered to selected molds.

6. The combination with a glass forming machine having a plurality of movable molds, a glass feeding device for delivering a quantity of glass to the mold proportional to the speed of operation of the machine, an electric motor for driving the machine and a rheostat for regulating the speed of operation of the machine, of means for automatically shunting the rheostat for effecting a change in speed of the machine at predetermined intervals.

7. The combination with a glass forming machine having a plurality of movable molds, a glass feeding device for delivering a quantity of glass to the mold proportional to the speed of operation of the said machine and a cam shaft for controlling movement of the feeding device, of means for automatically and at predetermined intervals during each cycle of operation varying the speed of the said machine controlled by the said cam shaft.

8. The combination with a glass forming machine having a plurality of molds, a glass feeding device, means for successively bringing the molds into registry with the feeding device, means controlled by the said mold moving means for actuating the glass feeding device to deliver a predetermined quantity of glass to the blank mold after the mold is brought into registry with the feeding device and means for varying the speed of the mold moving means at predetermined intervals during each cycle of operation.

9. The combination with a glass forming machine having a plurality of movable molds arranged in spaced relation and a glass feeding device for depositing quantities of glass in each mold when moved into registry with the feeding device, the quantity being proportioned to the time between successive movements of the molds, of means for automatically periodically accelerating or retarding movement of the molds during each cycle of operation so that different quantities of glass are delivered to different molds.

10. The combination with a glass forming machine having a plurality of movable molds, a glass feeding device for delivering a quantity of glass to the molds proportional to the speed of operation of the machine and a member for controlling movement of the feeding device, of an adjustable means for automatically, and at predetermined intervals, varying the speed of the machine during each cycle of operation controlled by said member.

In testimony whereof, I have hereunto subscribed my name this third day of March, 1925.

HENRY C. GANTER.